R. BUTTERWORTH.
MACHINE FOR GRINDING APPLES.
No. 49,714. Patented Sept. 5, 1865.
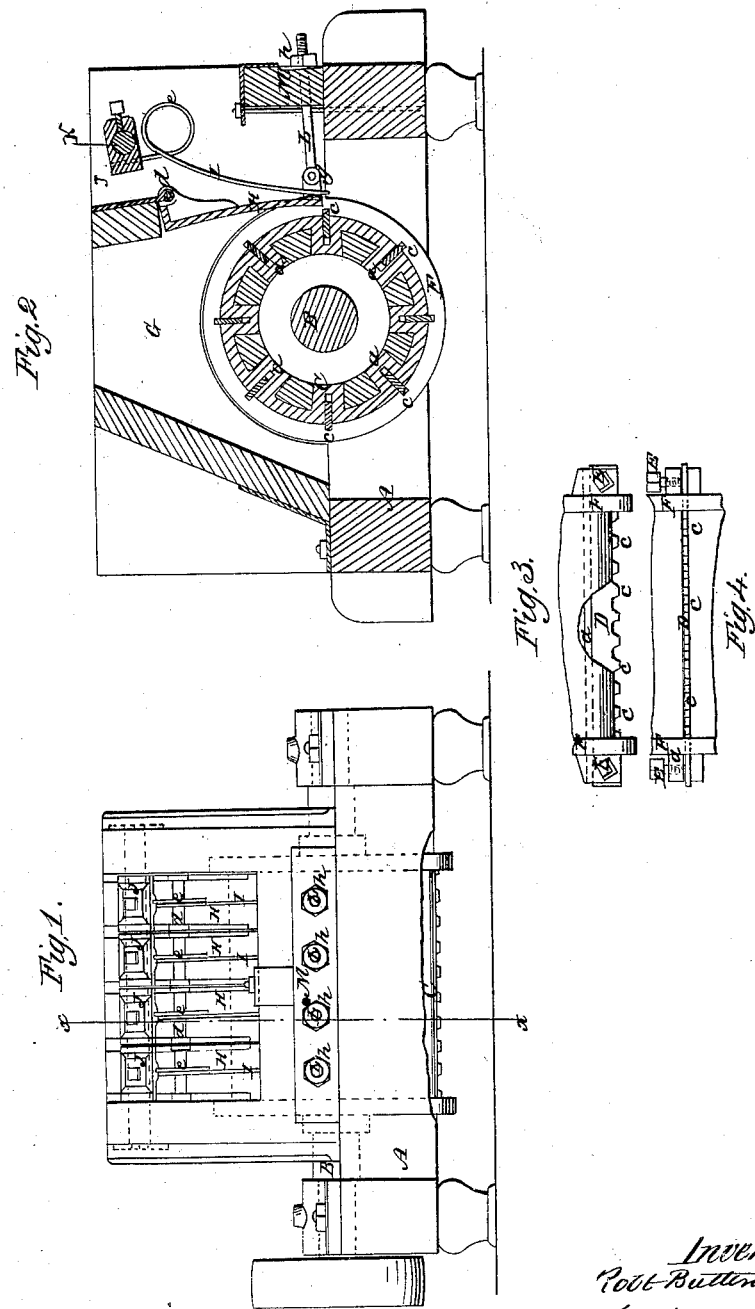

UNITED STATES PATENT OFFICE.

ROBERT BUTTERWORTH, OF TRENTON, NEW JERSEY.

IMPROVEMENT IN MACHINES FOR GRINDING APPLES.

Specification forming part of Letters Patent No. 49,714, dated September 5, 1865.

*To all whom it may concern:*

Be it known that I, ROBERT BUTTERWORTH, of Trenton, Mercer county, State of New Jersey, have invented a new and Improved Machine for Grinding Apples; and I do hereby declare that the following is a full, clear, and exact description thereof, which will enable others skilled in the art to make and use the same, reference being had to the accompanying drawings, forming part of this specification, in which—

Figure 1 is an end view of my invention; Fig. 2, a side sectional view of the same, taken in the line $x\ x$, Fig. 1; Figs. 3 and 4, detached sectional views of the grinding-cylinder.

Similar letters of reference indicate like parts.

This invention relates to a new and improved machine for grinding apples for the manufacture of cider; and it consists in a novel and improved construction of a grinding-cylinder, and also in the employment or use of a series of pressure-plates, arranged with springs in such a manner that the work may be done in an expeditious and perfect manner.

A represents what may be termed the "bed" or "framing" of the machine, on which a horizontal shaft, B, is placed, having a cylinder, C, upon it of cast-iron. This cylinder is hollow, and is cast with longitudinal boxes projecting a short distance beyond the heads of the cylinder, and having a set-screw, E, in each end of them, to secure the knives or cutters D in position. These knives or cutters are formed out of a single plate of steel, notched or cut at suitable and equal distances apart to form a series of cutting-projections, $c$, which have chisel-shaped edges, and are adjusted so as to project beyond the periphery of the cylinder C, the projections being secured in position, as previously stated, by the set-screws E. This will be fully understood by referring to Figs. 3 and 4. On each end of the cylinder C a wrought-iron band, F, is shrunk or otherwise secured, and over the cylinder a hopper, G, is placed, into which the apples to be ground or cut are placed.

H represents a series of plates which are secured to one side of the hopper G, and in fact from one side of it. These plates have a pendant position, and have joints at their upper parts, as shown at $d$. These plates H have springs I bearing against them, which may be constructed of steel wire bent so as to have two or more convolutions, $e$, and extending down so as to press against the lower parts of the plates. The upper ends of the springs I are secured in metal heads or blocks J, which are fitted loosely on a shaft, K, the ends of which are secured in the side plates or planking of the hopper in such a manner that it will not be allowed to turn, and the heads or blocks J are secured on the shaft K by set-screw $f$. By adjusting or turning the heads or blocks J on the shaft K the springs I may be made to exert a greater or less pressure against the plates H, as desired. Each plate H has a rod, L, attached to it by a joint, $g$, and these rods pass through a bar, M, and have nuts $h$ on their outer parts. By adjusting these nuts the plates H may be brought nearer to or farther from the periphery of the cylinder C, as will be fully understood by referring to Fig. 2. The plates H, it will be seen, form a sectional concave, as they are slightly curved, and each plate is allowed to yield or give to admit of hard foreign substances passing through the machine, the degree of resistance which the plates offer to such substances being regulated by adjusting the heads or blocks J on the shaft K which regulates the pressure of the springs I. When the cylinder C is rotated the apples are cut or ground by the knives between the cylinder C and the plates H, stones and other hard foreign substances forcing outward from the cylinder the plate H, with which they come in contact, so that they may pass through the machine without injuring any of its working parts, the springs I throwing the plates back to their original position as soon as the foreign substances have passed them.

The degree of fineness in which the apples are to be cut or reduced is regulated by adjusting the plates H through the medium of the nuts $h$.

The knives, when they require sharpening, may be taken out from the cutter C and reset in a short time and without any difficulty whatever.

I claim as new and desire to secure by Letters Patent—

1. A cast-metal cylinder provided with longitudinal boxes *a*, to receive the knives or cutters D, which boxes project beyond the ends or heads of the cylinder to receive set-screws E for setting the knives or cutters and securing them in position, substantially as set forth.

2. The sectional concave, composed of plates H, provided with joints, and having springs I bearing against their lower ends and regulated by rods L and nuts *h*, substantially as described.

3. The regulating of the pressure of the spring I against the plates H by means of the heads or blocks J on the fixed shaft K and the set-screw *f*, substantially as set forth.

ROBERT BUTTERWORTH.

Witnesses:
PETER SPRACKLEN,
JOHN BUTTERWORTH, Jun.